June 9, 1936.  C. C. STUCK  2,043,817
FISHING BOBBER
Filed May 25, 1934

Charles C. Stuck
INVENTOR
By Jefft & Jefft
ATTORNEYS

Patented June 9, 1936

2,043,817

UNITED STATES PATENT OFFICE 2,043,817

FISHING BOBBER

Charles C. Stuck, Beloit, Wis., assignor of one-half to R. C. Schneider, Beloit, Wis.

Application May 25, 1934, Serial No. 727,404

4 Claims. (Cl. 43—49)

My invention relates to fishing floats and particularly to a novelly constructed float which facilitates the fastening of a fish line thereto.

The primary object of the invention is the provision of a float which may be quickly and securely attached and readily removed from a fishing line without the necessity of knotting the said line.

Another object is the provision of a float, the construction of the attaching means being such that the line is not subjected to wear as is the case in floats now in use.

To this end, the invention consists of certain new and improved features of construction and combination of parts described in the following specification and illustrated in the accompanying drawing, it being understood that the right is reserved to make such changes in materials and details of construction as fairly fall within the scope of the appended claims.

In the accompanying drawing in which like numerals designate like parts throughout, Figure 1 is a side view of the float illustrating the first step of its attachment to a fish line;

Figure 1:
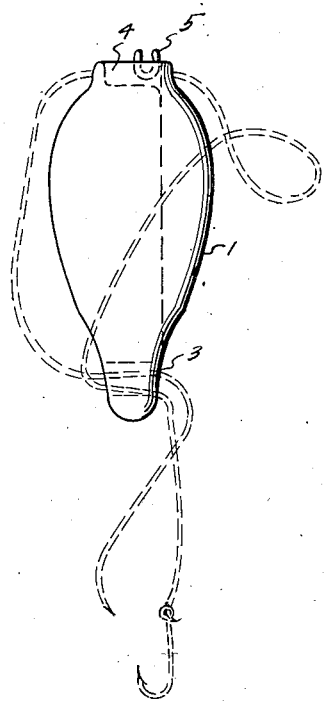

The invention comprises a float preferably ovoid in form which is hereafter generally indicated by the numeral 1. The said float may be made of wood, cork or other suitable buoyant material. A longitudinally extending slot 2 terminates in an aperture 3 bored in the smaller end of the said float, the opposite end of the slot terminates in a cup-shaped depression 4 formed in the opposite end of the said float.

A retaining member 5 is so positioned in the recess 4 as to have its hooked end extending across and bisecting the plane of the groove 2. The parts of the float that are in direct contact with the fish line are smoothed or beveled so that little or no wear occurs on the line when the device is used in conjunction therewith.

Figure 2:
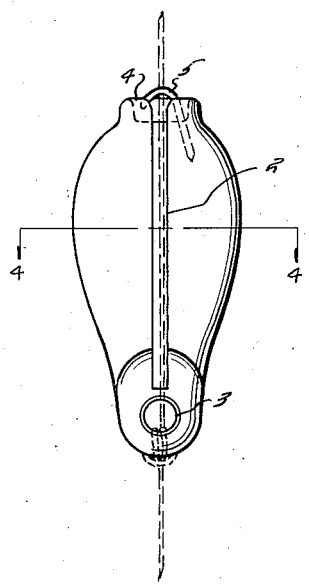
Fig. 2 is a side view illustrating the float attached to the line.
Figure 3:
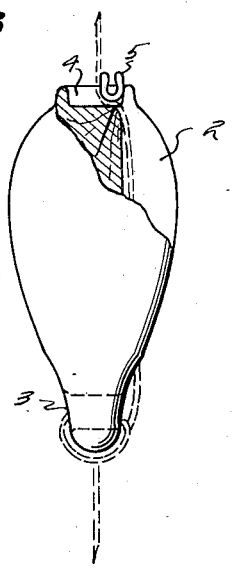
Fig. 3 is a view partially in plan and partially fragmentary of the float attached to a fish line.
Figure 4:
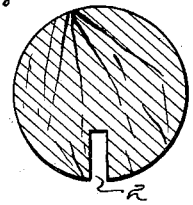
Fig. 4 is a cross sectional view on the line 4—4 of Fig. 2.

When it is desired to attach the float to a line, the said line is looped, the loop forced through the opening 3 and over the top of the float as illustrated in Fig. 1. The loop is then drawn taut and assumes the positions shown in Figs. 2 and 3. That end of the line running to the pole is then positioned within the longitudinally extending slot 2 and by a clockwise motion of the hand grasping the line, the said line is hooked under the retaining member 5.

Due to the fact that the under portion of the hook lies on the approximate plane of the top edges of the depression, and the depending end of the said hook is below said plane, it is practically impossible to disassociate the line from the hook by normal fishing activity.

If it is desirable to increase the length of the line from the float to the hook, the loop passing through the aperture 3 is loosened and that strand of the loop running through the retaining member 5 to the rod is pulled downward until the desired length of the line is had, whereupon the adjacent strand connecting with the hook is pulled downward until the loop is again taut, which results in an increase in the length of the line from the float to the hook.

Other benefits are had from the construction of the float. For instance, it may be readily used with short bait casting rods where it is desirable that the float be positioned directly adjacent the hook when the bait is thrown out. If the float is positioned a distance from the hook in the operation of throwing the bait out, the hook oftentimes becomes entangled in the line above the float. When my device is used, the end of the line is passed under the retaining member 5 down the groove 2 through the aperture 3. A piece of twig is tied at a predetermined place on the line above the retaining member 5. The hook is then fastened to the end of the line and due to centrifugal force exerted when the hook and float are cast, the float slips down the line and assumes a position directly adjacent the hook. However, upon lighting in the water, due to the weight of the hook, plus the weight of a sinker which is usually positioned adjacent the hook, the line will be pulled through the retaining member 5 and aperture 3 and will continue to sink until the twig tied at a predetermined position on the line stops the downward motion of the hook through contact with the retaining member 5 and the upper edge of the depression 4.

Particular emphasis is laid on the fact that the arrangement of parts and the construction generally of the device is such that little or no wear is had on a fish line. Thus the device can be applied to an expensive casting line with the advanced knowledge that the line will not be injured thereby.

From the foregoing it will be seen that a float has been provided which may be quickly attached to a line at any point without knotting or breaking the same, and in which the possibility of accidental detachment from the line is substantially precluded.

Having described my invention, what I claim and desire to secure by Letters Patent is:

1. A float comprising a body portion having a longitudinally extending kerf terminating in an orifice formed in the lower extremity of said body portion and lying in the plane of the axis of said body portion, a recess in the opposite extremity of said body in which the opposite end of the kerf terminates and a line retaining member disposed in said recess.

2. A float comprising a body portion, an orifice in the lower extremity thereof and lying in the plane of the axis of said body portion, a recess in the opposite extremity of said body and a line retaining member in said recess.

3. A float comprising a body portion having a longitudinally extending kerf terminating in an orifice in one end thereof, the said orifice lying in the plane of the axis of said body portion, a recess in the opposite extremity of said body, a line retaining hook mounted in said recess, the outer extremity of said hook terminating on or below the plane of the top edge of the recess.

4. A float comprising a body portion having a longitudinally extending kerf terminating in an orifice formed in the lower extremity of said body portion and lying in the plane of the axis thereof, an axially drilled recess in the upper extremity of said body portion, a line retaining hook mounted in one side of said recess, the hook portion thereof extending over the axial center of the recess and the outer extremity of said hook terminating on or below the plane of the top edge of said recess.

CHARLES C. STUCK.